United States Patent [19]
Burboeck

[11] 3,765,745
[45] Oct. 16, 1973

[54] MICROSCOPE STAGE
[75] Inventor: Hans Peter Burboeck, Morris Plains, N.J.
[73] Assignee: Carl Zeiss-Stiftung, Oberkochen/Wuerttemberg, Germany
[22] Filed: Apr. 10, 1972
[21] Appl. No.: 242,334

[52] U.S. Cl. .................................. 350/90, 350/87
[51] Int. Cl. ........................................ G02b 21/26
[58] Field of Search ......................... 350/86, 87, 90

[56] References Cited
UNITED STATES PATENTS

| | | | |
|---|---|---|---|
| 2,003,387 | 6/1935 | Ott | 350/90 X |
| 198,607 | 12/1877 | Gundlach | 350/90 |
| 211,507 | 1/1879 | Gundlach | 350/90 |
| 686,466 | 11/1901 | Martins | 350/90 |

Primary Examiner—David H. Rubin
Attorney—Nichol M. Sandoe et al.

[57] ABSTRACT

The invention contemplates a microscope including a stage for supporting a slide for selective positioning in liquid-immersed contact with part of an optical system, such as a field-illuminating condenser element. The arrangement is such that the plane of liquid contact is offset from the adjacent plane of the stage platform and so that selective positioning of the slide cannot result in liquid contact with the stage or with any slide-supporting element.

9 Claims, 3 Drawing Figures

PATENTED OCT 16 1973
3,765,745
Fig.1.
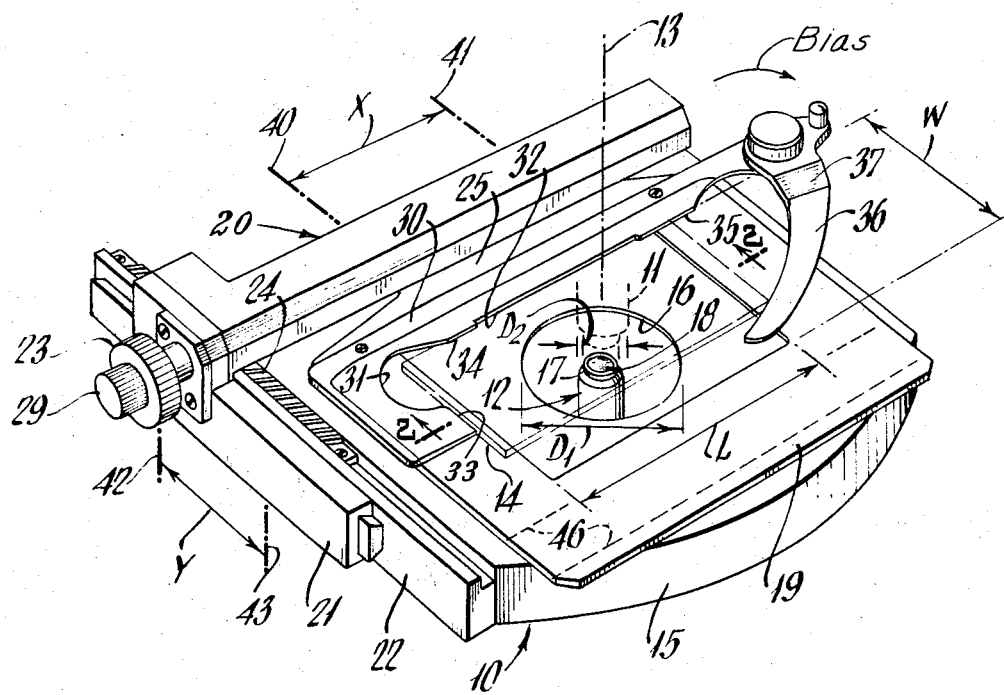
Fig.2.
Fig.3.
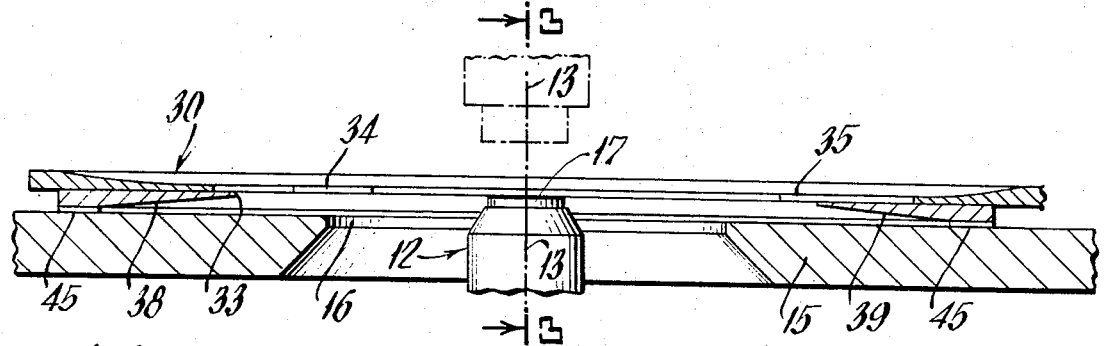

MICROSCOPE STAGE

This invention relates to a microscope construction and in particular to a stage for supporting and selectively positioning a microscope slide in liquid-immersion contact with an adjacent optical surface, such as a flat illuminating-condenser surface.

In the traditional fabrication of microscopes of the character indicated, the microscope slide is supported directly on a stage platform, and selectively operable positioning means determines the displacement of the slide on the platform, to the end that a selected area of the slide is placed in the field of the microscope. In a liquid-immersed optical coupling to such a slide, liquid is necessarily smeared over the slide and the liquid will wet the stage platform if there is a sufficient manipulative displacement of the slide. For slides which have multiple specimens at locales spaced to an extent approaching the span of the stage opening for such optical means, it is unavoidable that immersion liquid will wet the stage. Such wetting accumulates, dries to the point of stickiness, attracts contaminating foreign matter and in general interferes with the overall use of the instrument.

Procedures for periodic cleaning are necessary, and technicians have had to accept such procedures as a fact of life.

It is an object of the invention to provide an improved construction of the character indicated, wherein such procedures are materially, if not totally rendered unnecessary.

Another object is to provide an improved microscope stage construction wherein immersion-liquid wetting of stage parts is inherently avoidable.

A specific object is to achieve the above objects in a stage which accommodates a microscope slide with a useful specimen area having span equal to or exceeding half the span of the stage-platform opening which accommodates the optical element which is liquid-immersion coupled to the slide.

Other objects and various further features of novelty and invention will be pointed out or will occur to those skilled in the art from a reading of the following specification in conjunction with the accompanying drawings. In said drawings, which show, for illustrative purposes only, a preferred form of the invention:

FIG. 1 is a perspective view of the stage and adjacent parts of a microscope of the invention;

FIG. 2 is a simplified, enlarged sectional view taken at 2—2 in FIG. 1; and

FIG. 3 is a similar sectional view, taken at 3—3 in FIG. 2.

The drawings show a stage 10 of the invention as embodied in a microscope having frame-based viewing-objective and illuminating systems 11–12 on a common upstanding optical axis 13, for examining selected regions of a specimen slide 14. The viewing system 11 is above the specimen slide 14 and the illuminating system 12 is below. The stage 10 is built on a frame-based platform 15 having a central circular opening 16 (of diameter $D_1$) which accommodates an upwardly projecting element 17 of the illuminating system; system 17 terminates in a condenser lens having an upwardly facing flat optical surface 18, closely adjacent the underside of slide 14. A drop of liquid, such as a suitable oil, placed on surface 18 is the means of direct optical transmission of light to the body of slide 14, at the local region of interest, thus establishing a liquid-immersion coupling to the slide.

In accordance with the invention, the slide 14 is so supported that the immersion liquid which necessarily wets the underside of slide 14 cannot be drawn into contact with any part of the stage, in spite of a large range of manipulative positioning of slide 14, in the course of completing an examination of the total possible specimen area of the slide. This is accomplished through the employment of an auxiliary stage or flat plate 19, of thickness substantially exceeding the relatively small physical clearance through which liquid-immersed optical coupling is established; plate 19 has a large central opening, of length L just short of that of the microscope-slide 14. Plate 19 may for example be of metal, 2mm thick, and is slidable on the upper surface of platform 15.

Stage 10 is shown with selective positioning means comprising two manually operable orthogonally related, rectilinearly guided drives for plate 19. A first or main slide comprises an arm 20, secured to a base 21. Base 21 has a dovetail-guided relation with an elongate frame member 22 secured to a side margin of the stage platform 15. A knob 23 on arm 20 drives a pinion (not shown) meshing with a rack 24 secured to member 22, thus enabling a Y-axis selective positioning of arm 20. Plate 19 is effectively a cross slide, having a tongue 25 secured at 26 to nut means 27 (see FIG. 3) forming part of second-component positioning means. Nut means 27 is in constant threaded engagement with lead-screw means 28 journalled in arm 20 and manually operable upon adjustment of a second knob 29, thus enabling an X-axis selective positioning of plate 19.

To complete the identification of parts, microscope-slide location on plate 19 is achieved by suitable abutments which may all be formed in or carried by an abutment plate 30, secured to plate 19. Plate 30 is shown generally L-shaped and is relieved at 31–32 to permit clean and unambiguous slide-margin referencing, at one end to an end abutment 33, and along one side to spaced edge abutments 34–35. A swing arm 36 is pivotally carried at the remote end of plate 30, and the connection incorporates a residual spring bias, in the clockwise direction, as indicated by legend in FIG. 1; a downward offset 37 in arm 36 brings the substantial extent of arm 36 into the plane of plate 30, so that arm 36 may have resiliently urged corner contact with slide 14, thus completing the abutment system of slide retention and location.

The length L of the plate opening, being just short of the length of slide 14, enables end margin support of the slide on plate 19, and abutment plate 30 is so located on plate 19 as to offset or set back the abutment 33 from the adjacent edge of the opening in plate 19, to establish such slide support, as will be understood. On the other hand, plate 30 is preferably so secured as to position abutments 34–35 clear of the adjacent longitudinal edge of the opening in plate 19, thus enabling immersion liquid to wet slide 14 all the way to its longitudinal edge, without exposing the same for wetting contact with plate 19; preferably, the effective width W of the opening of plate 19 is so selected as to exceed the width dimension of anticipated microscope-slide sizes, so as to also assure against wetting plate 19 at the opposite longitudinal edge of its opening. As a further precaution, anticipating such accidental or careless removal of a wetted slide 14 as to cause immersion liquid to catch on one of the longitudinal ends of the opening in plate 19, I show in FIG. 2 a preference that these edges be relieved along the bottom surface of plate 19, as indicated at 36–37.

As a further feature of the invention, each of the orthogonally related positioning systems includes limiting abutments or stops whereby the X and Y components of displacement are only permitted over a particular limiting range. FIG. 1 will be understood to provide a schematic showing of such abutment means for X-displacement of plate 19, at limits 40–41, and for Y-displacement of plate 19, at limits 42–43. Such abutment means are contained within arm 20, for the X range of positioning adjustment, and within base 21, for the Y range of positioning adjustment. In both cases, the limiting means (40–41; 42–43) are selected with reference to the relation between (a) the effective diameter $D_2$ of the upwardly projecting element 17 of the illuminating system and (b) the particular effective span (L or W) of interest in the opening of plate 19. Thus, in the rectilinear X-positioning range between limits 40–41, the operative positions of these limits are so selected that the rectilinear center of the opening of plate 19 (i.e., mid-point of the span L) is movable only (i.e., at least no more than) a first predetermined distance on each side of the optical axis 13, said amount being less than one half the difference between the rectilinear extent L of the plate opening and the effective diameter $D_2$ of the optical element; in the rectilinear Y-positioning range between limits 42–43, the operative positions of these limits are so selected that the rectilinear center of the opening of plate 19 (i.e., midpoint of the span W) is movable only (i.e., at least no more than) a second predetermined distance on each side of the optical axis 13, said amount being less than one half the difference between the rectilinear extent W of the plate opening and the effective diameter $D_2$ of the optical element.

With structure as described, and with the respective rectilinear L and W margins of the plate opening parallel to the respective orthogonal positioning guide systems, the slide 14 may present a relatively large specimen area (or area of plural specimens) for successive examination, using the same liquid-immersion coupling throughout the examination, even to the marginal limits of displacement (40–41, 42–43). Slide wetted areas never contact any of the stage structure. Immersion liquid thus stays clean and uncontaminated, and so also does the stage structure. It is thus feasible to affix a self-lubricating bearing surface to the underside of plate 19, as suggested by the spaced longitudinally aligned areas 45–46, without contamination of these areas with immersion liquid or foreign matter entrained thereby; a coating or adhered film of polytetrafluoroethylene is preferred at each of the areas 45–46.

The described device will be seen to have achieved all stated objects, assuring cleaner maintenance of the instrument and simplified procedures.

While the invention has been described in detail for the preferred form shown, it will be understood that modifications may be made without departure from the invention.

What is claimed is:

1. In a microscope, a frame, a stage comprising a platform having a flat upper surface and carried by said frame, said platform having a central opening, optical means carried by said frame beneath said stage and including an element on an axis projecting upwardly through said opening and to an elevation above said upper surface, said element including a flat optical surface at an elevation offset above said upper surface of said platform, slide-holder means including a flat plate slidable on the upper surface of said platform, said plate being centrally open over an area greater than the central opening of said platform, selectively operable positioning means coacting between said platform and said slide-holder means for selectively positioning the opening of said plate with respect to the axis of said projecting element, said slide-holder means including margin-locating abutment means for a specimen slide carried by said plate, said abutment means comprising at least two generally opposed abutment elements which are set back from the adjacent edge of the open area of said plate, whereby the specimen area of translucent specimen slide may be supported by and located on said plate in the span between said generally opposed abutments, said optical surface being in such close adjacency to the plane of the upper surface of said plate that said optical surface and the underside of the microscope slide may be in liquid-immersed contact, the thickness of said plate substantially exceeding the axial offset of said optical flat surface from the slide-supporting surface of said plate, said positioning means including a rectilinear-guide and margin-limiting abutment means limiting the range of displacement of the rectilinear center of said plate within a predetermined amount on each side of the optical axis, said amount being less than one half the difference between the rectilinear extent of the plate opening and the rectilinear extent of the optical surface, all said rectilinear quantities being taken along an axis in the plane of microscope-slide support and through the optical axis, whereby immersion liquid is kept from contact with said plate at even the marginal limits of operation of said positioning means.

2. A microscope according to claim 1, in which said positioning means comprises two orthogonally related positioning systems for selective two-component positioning of the microscope slide with respect to said optical surface.

3. A microscope according to claim 2, in which said optical element is circular at the plane of the optical surface, and in which said plate opening is generally rectangular with sides parallel to the respective orthogonally related positioning systems.

4. A microscope according to claim 3, in which each positioning system includes a rectilinear guide and abutment means limiting the range of displacement of the rectilinear center of the opening of said plate to a predetermined amount on each side of the optical axis, said amount being less than one half the difference between the rectilinear extent of the plate opening and the effective diameter of said optical element, the rectilinear quantities for one positioning system being taken parallel to the axis of one of the orthogonal guides and the rectilinear quantities for the other positioning system being taken parallel to the axis of the other orthogonal guide.

5. A microscope according to claim 1, in which the underside of said plate is marginally relieved.

6. A microscope according to claim 1, in which said optical means is part of a stage illuminator.

7. In a microscope, a frame, a stage comprising a platform having a flat upper surface and carried by said frame, said platform having a central opening, optical means carried by said frame beneath said stage and including an element on an axis projecting upwardly through said opening and to an elevation above said upper surface, said element including a flat optical surface at an elevation offset above said upper surface of said platform, slide-holder means including a flat plate carrying a layer of self-lubricating material on its lower surface and slidable on the upper surface of said platform, said plate being centrally open over an area greater than the central opening of said platform, selectively operable positioning means coacting between said platform and said slide-holder means for selectively positioning the opening of said plate with respect to the axis of said projecting element, said slide-holder means including margin-locating abutment means for a specimen slide carried by said plate, said abutment means comprising at least two generally opposed abutment elements which are set back from the adjacent edge of the open area of said plate, whereby the specimen area of a translucent specimen slide may be supported by and located on said plate in the span between said generally opposed abutments, said optical surface being in such close adjacency to the plane of the upper surface of said plate that said optical surface and the underside of the microscope slide may be in liquid-immersed contact, and margin-limiting means operative to confine positioning movement of said slide-holder means to an extent that said optical means can never contact any part of the edge of the centrally open area of said plate, whereby immersion liquid may be in continuous contact with any specimen-slide area of currently positioned interest to permit specimen scanning without danger of immersion-liquid contact with said plate or with the self-lubricating layer.

8. The microscope of claim 7, in which said self-lubricating layer includes polytetrafluoroethylene.

9. In a microscope, a frame, a stage comprising a platform having a flat upper surface and carried by said frame, said platform having a central opening, optical means carried by said frame beneath said stage and including an element on an axis projecting upwardly through said opening and to an elevation above said upper surface, said element including a flat optical surface at an elevation offset above said upper surface of said platform; and a unit-handling slide-holder assembly including a flat slide-holder plate slidable on the upper surface of said platform, said plate being centrally open over an area greater than the central opening of said platform, selectively operable positioning means including a mounting element securable to a part carried by said platform and coacting between said platform and said slide-holder plate for selectively positioning the opening of said plate with respect to the axis of said projecting element, said slide-holder means including margin-locating abutment means for a specimen slide carried by said plate, said abutment means comprising at least two generally opposed abutment elements which are set back from the adjacent edge of the open area of said plate, whereby the specimen area of a translucent specimen slide may be supported by and located on said plate in the span between said generally opposed abutments, said optical surface being in such close adjacency to the plane of the upper surface of said plate that said optical surface and the underside of the microscope slide may be in liquid-immersed contact, and margin-limiting means operative to confine positioning movement of said slide-holder plate to an extent that said optical means can never contact any part of the edge of the centrally open area of said plate.

* * * * *